(12) United States Patent
Charlet et al.

(10) Patent No.: US 7,382,525 B2
(45) Date of Patent: Jun. 3, 2008

(54) OPTICAL AMPLIFICATION UNIT WITH SPAN LOSS TILT COMPENSATION, FIBER OPTICAL TRANSMISSION SYSTEM COMPRISING THE SAME, AND CORRESPONDING METHODS

(75) Inventors: Gabriel Charlet, Villiers-le-Bacle (FR); Christian Simonneau, Antony (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 11/583,021

(22) Filed: Oct. 19, 2006

(65) Prior Publication Data

US 2007/0115538 A1    May 24, 2007

(30) Foreign Application Priority Data

Nov. 21, 2005   (EP) ................... 05292483

(51) Int. Cl.
*H01S 3/00* (2006.01)
(52) U.S. Cl. ................... 359/337.1; 359/337.4
(58) Field of Classification Search ............ 359/337.1, 359/337.4, 337.5
See application file for complete search history.

(56) References Cited

U.S. PATENT DOCUMENTS

| 6,359,727 | B1 |   | 3/2002 | Nakazato |   |
|---|---|---|---|---|---|
| 6,437,906 | B1 |   | 8/2002 | Di Pasquale et al. |   |
| 6,690,505 | B1 |   | 2/2004 | Ye |   |
| 6,865,016 | B2 | * | 3/2005 | Sugaya et al. | 359/337.1 |
| 2002/0001124 | A1 | * | 1/2002 | Kinoshita et al. | 359/337.1 |
| 2004/0136053 | A1 | * | 7/2004 | Sugiya | 359/337.1 |

FOREIGN PATENT DOCUMENTS

| EP | 1 065 821 A2 |   | 1/2001 |
|---|---|---|---|
| EP | 1280288 A1 | * | 1/2003 |

OTHER PUBLICATIONS

A. Uy et al, "Analysis of dual-stage erbium-doped fibre amplifiers with passive equalisation filters", IEE Proceedings: Optoelectronics, Institution of Electrical Engineers, Stevenage, GB, vol. 146, No. 3, Jun. 18, 1999, pp. 153-158, XP006013634.

* cited by examiner

*Primary Examiner*—Mark Hellner
(74) *Attorney, Agent, or Firm*—Sughrue Mion, PLLC

(57) ABSTRACT

An optical amplification unit comprises at least one optical amplifier for amplifying an optical signal and a filter preceding or following the optical amplifier. The optical amplifier comprises a first measuring device for measuring a property of an input signal of the optical amplifier, a second measuring device for measuring a property of an output signal of the optical amplifier, and a control circuit for controlling a gain characteristic of the optical amplifier in dependence of said input and output signal properties. The filter exhibits a wavelength-dependent attenuation of the optical signal. The optical amplification unit is connectable to an optical fiber span and the filter is adapted to compensate for a span loss tilt caused by said optical fiber span. An optical transmission system with at least one such optical amplification unit and corresponding methods.

12 Claims, 3 Drawing Sheets

OPTICAL AMPLIFICATION UNIT WITH SPAN LOSS TILT COMPENSATION, FIBER OPTICAL TRANSMISSION SYSTEM COMPRISING THE SAME, AND CORRESPONDING METHODS

The invention is based on a priority application EP 05 292 483.4 which is hereby incorporated by reference.

TECHNICAL FIELD

The invention relates to an optical amplification unit comprising at least one optical amplifier for amplifying an optical signal, the optical amplifier comprising a first measuring device for measuring a property of an input signal of the optical amplifier, a second measuring device for measuring a property of an output signal of the optical amplifier, and a control circuit for controlling a gain characteristic of the optical amplifier in dependence of the input and output signal properties, the optical amplification unit further comprising a filter.

BACKGROUND OF THE INVENTION

Optical amplification units are used e.g. in fiber optical transmission systems. Such systems normally comprise an optical fiber line with a plurality of optical fiber spans interconnected by a plurality of these optical amplification units.

In such optical transmission systems, Wavelength Division Multiplexing (WDM), in particular Dense WDM (DWDM), permits simultaneous transmission of multiple channels over a common optical fiber line. Erbium Doped Fiber Amplifiers (EDFA) provide a cost-effective means for optical amplification in such systems, as EDFAs amplify all the wavelengths simultaneously, enabling the composite optical signals to travel large distances without regeneration.

However, transmission power is influenced by fiber attenuation which is partly due to Rayleigh scattering. The fiber attenuation is responsible for a transfer of power from lower wavelength channels to higher wavelength channels. Consequently, lower wavelength channels encounter a higher span loss in an optical fiber span than higher wavelength channels, thus causing a span loss tilt in the per channel loss in an optical fiber span, see e.g. FIG. 6 for the span loss dependence of wavelength channels in a wavelength range from 1530 nm to 1565 nm.

The number of wavelength channels may vary due to a fiber break for example, when only a few channels remain. The number of channels may also vary in fiber optical systems, in particular ultra long haul (ULH) optical systems with multiple reconfigurable optical add/drop multiplexing (ROADM). In ROADM systems the number of multiplexed frequency channels may vary, e.g. between 1 and 80.

If the optical amplification unit works in constant gain mode, the operating point of the optical amplification unit is conventionally determined to compensate for the average span loss in full load configuration, when all or most of the channels are present. The span loss tilt is then conventionally taken into account by tilting the gain of the optical amplifier using a filter, e.g. a variable optical attenuator (VOA) exhibiting a constant loss versus wavelength, comprised in the optical amplifier. A VOA is usually used within the interstage of an EDFA to adjust the EDFA tilt. By changing the attenuation of the VOA, the overall gain of the EDFA changes (if the input power and the output power are kept constant, the output power depends mainly of the pump power set within the EDFA), and generates a tilt (the inversion parameter of the Erbium doped fiber changes and it modifies the gain shape).

The operating point for an optical amplification unit which compensates for the average span loss in the full load configuration is 19.9 dB in the example of FIG. 6. This operating point conventionally remains constant, even when the load configuration is changed and the number of channels carried by the fiber optical system is changed. If, for example, only a few channels are present around e.g. 1530 nm, the span loss encountered by these channels due to the span loss tilt will be 20.2 dB (cf. FIG. 6). As the operating point of the optical amplification unit is 19.9 dB in this example, the optical amplification unit will still be controlled to have a gain of 19.9 dB. Therefore, the gain error will be 0.3 dB per fiber span in this example case. After 20 optical amplification units and following fiber spans, the accumulated error will be 6 dB, which is not acceptable. Tilting the gain of the optical amplifier, e. g. using a VOA, has not the desired compensation effect, as the remaining channels are located at the same wavelength.

In U.S. Pat. No. 6,437,906 B1, an optical amplifier for a wavelength division multiplexing (WDM) system is described that comprises a filter for inverting the tilt of the WDM signals. The filter is. All the EDFAs installed contain a Gain Flattening Filter (GFF) as a part of the control loop of the optical amplifier to minimize the gain excursion versus the wavelength generated by the natural gain shape of the Erbium doped Fiber.

SUMMARY OF THE INVENTION

It is the object of the invention to provide a fiber optical amplification unit of the above-mentioned kind providing an amplification of the optical signal which compensates for span loss and span loss tilt of the optical signal being to a large extent independent of the channel loading conditions.

This object is achieved by an optical amplification unit wherein the filter precedes or follows the optical amplifier and exhibits a wavelength-dependent attenuation of the optical signal adapted to compensate for a span loss tilt caused by an optical fiber span connectable to the optical amplification unit.

According to the invention, the filter is located outside of the optical amplifier, i.e. outside of the control loop formed by the first and second measuring device (preferably comprising a photodiode) and the control circuit, so that its effect is not taken into account for adjusting the gain of the amplifier. Also, the filter only compensates for the tilt generated by the fiber span (and not for the tilt and the gain excursion generated by the amplifier). As a result, the effective span loss tilt is close to 0 dB and does not depend on the channel loading conditions. Preferably, a filter with fixed wavelength dependent attenuation is used to compensate for the span loss tilt. The filter characteristic has to be adapted to the expected span loss tilt which is known beforehand or can be measured for different types of optical fibers.

In a highly preferred embodiment, the optical amplifier is driven in constant gain mode. When the input power of the amplifier is reduced, e.g. due to fiber loss increases, the control circuit can be used for adjusting the pump power of the optical amplifier, being preferably an EDFA, such that the output pump power is reduced and a constant overall gain of the optical amplifier is achieved.

In a further embodiment, the filter is a fiber Bragg grating, which is preferably placed preceding the optical amplifier.

By using such a filter type, the impact of the filter on the noise figure due to the insertion loss of the filter at the input of the amplifier can be minimized. It is also possible to place the filter at a location following the optical amplifier. In this case, the filter will slightly reduce the output power of the optical amplification unit which can be compensated for by increasing the output power by changing the operating point of the optical amplifier to a higher gain.

A preferred embodiment of the optical amplification unit comprises two or more optical amplifiers. In this embodiment the filter can be placed preceding the first optical amplifier or following the last optical amplifier. Placed like this the filter is not taken into account by the control circuits of the optical amplifiers, as the filter is located outside their respective control loops. The filter can alternatively be placed in between two optical amplifiers. In this embodiment, the two optical amplifiers have to be controlled independently of one another, preferably in constant gain mode, the control circuit of each of the two optical amplifiers only taking into account the signal properties measured by its own first and second measuring device for adjusting the gain.

In a further preferred embodiment of the invention, the amplification unit further comprises an optical device generating an additional tilt and the filter is adapted to compensate for the span loss tilt and the additional tilt. In this case, the span loss tilt and the additional tilt of the optical device, e.g. a dispersion compensation module, can be compensated for at the same time.

The invention is also realized in a fiber optical system for transmitting an optical signal, in particular a WDM system, comprising an optical fiber line with a plurality of successive optical fiber spans, at least two of which are interconnected by an optical amplification unit according to the present invention. In such an optical transmission system, an effective span loss tilt of a sequence of fiber spans and/or optical devices generating additional span loss tilt can be compensated for. As different fiber spans may cause different span loss tilts, the filter is preferably adjusted to compensate for an average span loss tilt of the fiber spans comprised in the fiber line. Also in this case, an effective span loss tilt of almost 0 dB can be achieved. It is also possible to use more than one optical amplification unit according to the invention in the same fiber line, each being adapted to compensate only for a span loss tilt of exactly one preceding or following fiber span.

In a fiber optical transmission system comprising one or a plurality of optical amplification units according to the present invention, the gain error which is caused when the amplification units are driven in constant gain mode and a number of channels is dropped can be greatly reduced, thus enabling for the optical signals to be transmitted over longer distances at lower cost, as the margins allocated for various loading conditions can be reduced and the overall system performance is improved.

The invention is also realized in a method for amplifying an optical signal, in particular in an optical amplification unit as described above, comprising the steps of: (a1) measuring a property of an input signal of an optical amplifier, (a2) measuring a property of an output signal of said optical amplifier, (a3) controlling a gain characteristic of said optical amplifier in dependence of said input and output signal properties, (b) filtering said optical signal for compensating for a span loss tilt generating a wavelength-dependent attenuation of said optical signal, wherein steps (a3) and (b) are performed independently from one another, thus allowing for compensation of span loss tilt even though channels are added/dropped.

BRIEF DESCRIPTION OF THE DRAWINGS

Further advantages can be extracted from the description and the enclosed drawing. The features mentioned above and below can be used in accordance with the invention either individually or collectively in any combination. The embodiments mentioned are not to be understood as exhaustive enumeration but rather have exemplary character for the description of the invention.

The following detailed description of the invention refers to the accompanying drawing. The same reference numerals may be used in different figures of the drawing to identify the same or similar elements.

DETAILED DESCRIPTION OF PREFERRED EMBODIMENTS

Figure 1:
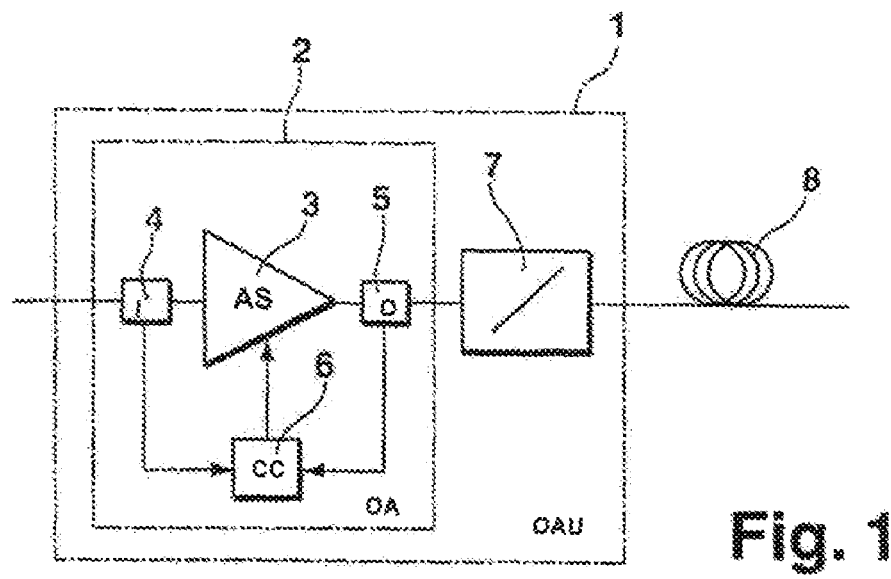
FIG. 1 shows a first embodiment of an optical amplification unit according to the invention and a following fiber span.

FIG. 1 shows an optical amplification unit 1 (OAU) with an optical amplifier 2 (OA), in the present case an EDFA, comprising an amplification stage 3 (AS) with a Gain Flattening Filter GFF (not shown) in order to compensate for the non flat gain of the Erbium doped Fiber, an input measuring device 4(I), an output measuring device 5(O) and a control circuit 6 (CC). The optical ampbtication unit 1 farther comprises a filter 7 and is connectable to an optical fiber span 8. Optical amplification units like the one shown in FIG. 1 are used in. a fiber optical transmission system as described below in connection with FIG. 5.

The input and output measuring devices 4, 5 are preferably a photodiode measuring the input and output power to the optical amplifier 2 or a property related to the input and output power of the optical amplifier 2, respectively. The control circuit 6 controls the gain characteristic of the optical amplifier 2 by using the property measured by the input measuring device 4 and the property measured by the output measuring device 5 to control the amplification stage 3 to produce a predefined gain characteristic. In the present case, the optical amplifier 2 is controlled in constant gain mode, i.e. a constant gain characteristic is used to compensate for an average span loss in the fiber span 8 following the optical amplification unit 1 and/or a fiber span preceding the amplification unit 1 (not shown) over a given wavelength band (e.g. C-band). The control circuit 6 controls the optical amplifier 2 to work at that predefined operating point corresponding to a constant gain value.

Figure 6:
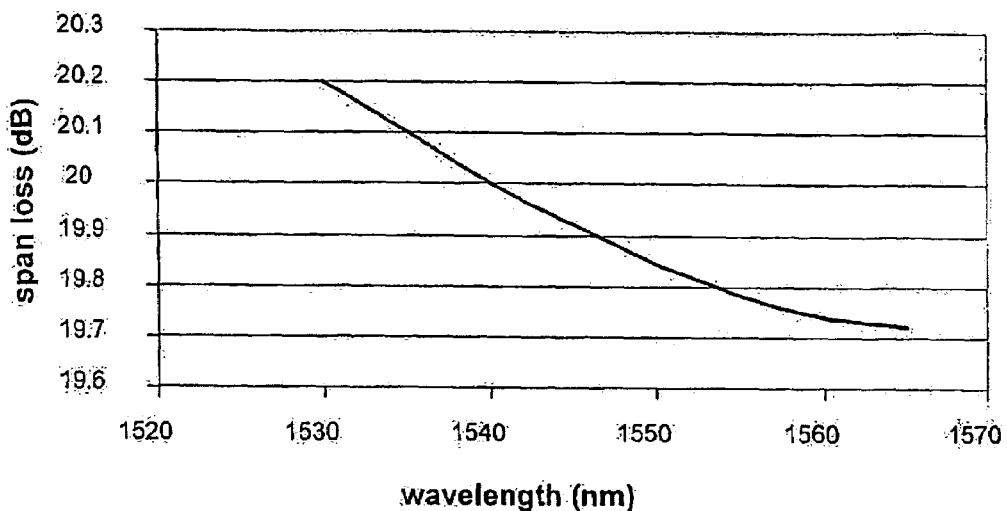
FIG. 6 shows a diagram depicting span loss in dependence of optical wavelength.

The filter 7 exhibits a fixed wavelength dependent attenuation of the optical signal which is used to compensate for the span loss tilt (cf. FIG. 6) generated by the optical fiber span 8. The filter 7 exhibits for each wavelength channel an attenuation of the output signal of the optical amplifier 2 which is adapted to compensate for the span loss encountered by that particular wavelength channel. In this way, a span loss tilt over the wavelength channels of close to 0 dB can be achieved. Furthermore, the loss over the channels is no longer wavelength-dependent.

Figure 5:
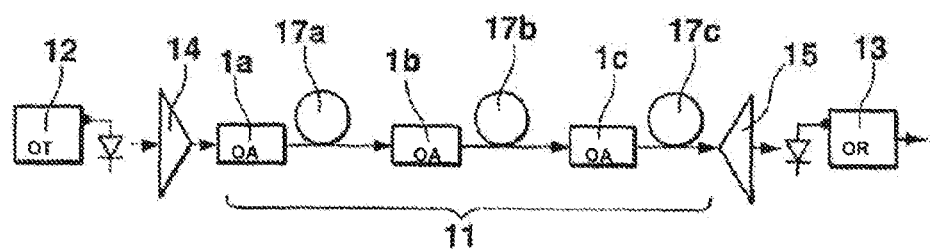
FIG. 5 shows an embodiment of an optical transmission system according to the invention.

The use of the amplification unit 1 shown. in FIG. 1 in a fiber optical transmission system is represented in FIG. 5. The transmission system comprises an optical fiber line 11 with a plurality of optical fiber spans 17a to 17c interconnected by a plurality of optical amplification units distributed successively along the tiber line 11, three of which (1a to 1c) are shown, each being of the type represented in. FIG. 1. The optical fiber line 11 is arranged between an optical transmitter 12 (OT) and an optical receiver 13 (OR). At the transmitter end of the optical fiber line 11, a multiplexer 14 is arranged which performs wavelength division multiplexing (WDM) to optical signals with different wavelengths entering the multiplexer, forming a wavelength multiplexed signal which is transmitted through the optical fiber line 11 and demultiplexed in a demultiplexer 15 at the receiver end of the optical fiber line 11.

The three the amplification units 1a to 1c of FIG. 5 are driven in constant gain mode and comprise each a filter for correcting a span loss tilt generated in the fiber spans 17a to 17c. Filters with identical wavelength-dependent attenuation are chosen for all amplification units 1a a to 1c, the tilt of which being chosen to be the average tilt calculated by considering the span loss tilt of the three fiber spans 17a to 17c. Alternatively, it is possible that only one or a few of the amplification units to 1a to 1c are provided with a filter compensating for the average tilt. However, in this case, care must be taken that these filters do not generate too much loss, thus impacting strongly on the OSNR.

Figure 2:
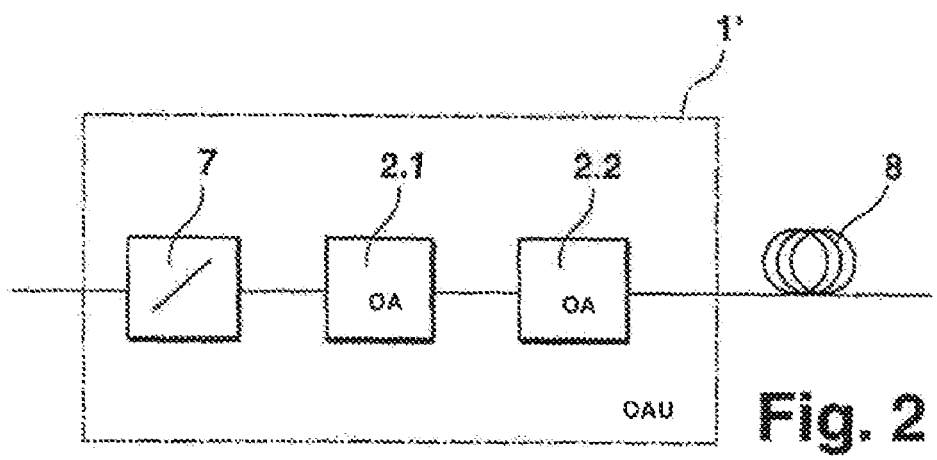
FIG. 2 shows a second embodiment of an optical amplification unit according to the invention comprising two optical amplifiers preceded by a filter.

FIG. 2 shows a modified optical amplification unit 1' comprising two optical amplifiers 2.1 and 2.2 of the type described in FIG. 1. In this case, the filter 7 is placed preceding the first optical amplifier 2.1 and therefore has an impact on the noise value of the optical amplification unit 2.1. The magnitude of the impact on the noise depends on the insertion loss of the filter 7. The impact on the noise can be made very small using a filter 7 with fiber Bragg grating technology.

Figure 3:
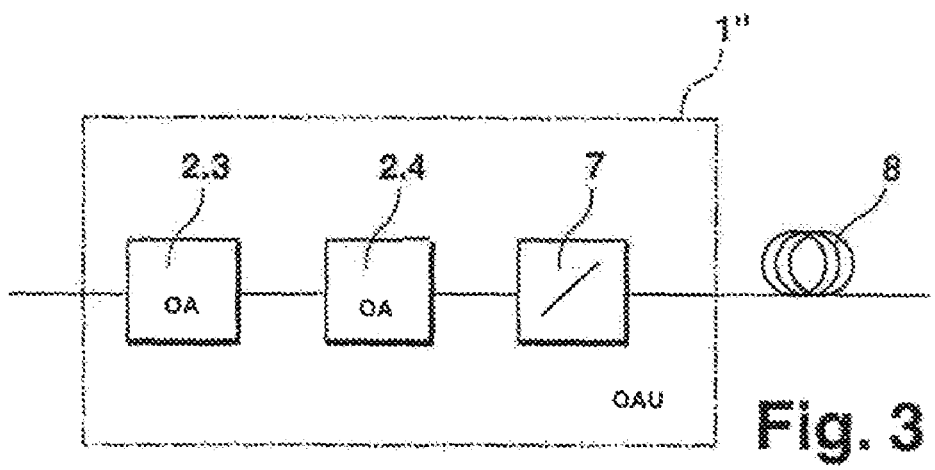
FIG. 3 shows a third embodiment of an optical amplification unit comprising two optical amplifiers followed by a filter.

FIG. 3 shows another modified optical amplification unit 1" comprising two optical amplifiers 2.3 and 2.4 of the type shown in FIG. 1. In this embodiment, the filter 7 is placed following the second optical amplifier 2.4 being the last optical amplifier of the amplification unit 1". Placing the filter 7 at a location following the second optical amplifier 2.4 will reduce the output power of the optical amplification unit 1". This reduction can be compensated for by adjusting the gain to provide a small amount of extra pump power in the optical amplifier 2.4.

Figure 4:
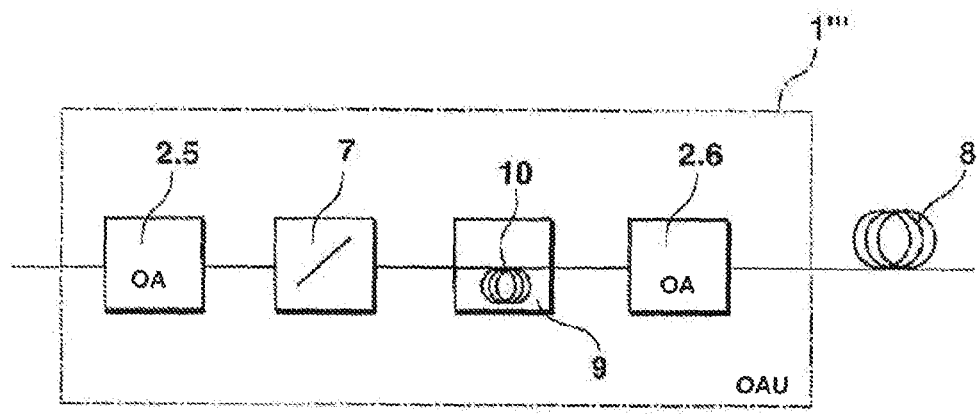
FIG. 4 shows an optical amplification unit comprising two optical amplifiers and a mid-stage optical device.

FIG. 4 shows a further modified optical amplification unit 1''' comprising two optical amplifiers 2.5 and 2.6 as described in FIG. 1. In this case, the filter 7 is placed in between the two optical amplifiers 2.5 and 2.6. The two optical amplifiers 2.5 and 2.6 have to be controlled independently, with each optical amplifier controlling its gain, preferably in constant gain mode, using only values measured by its own photodiodes 4, 5. In the amplification unit 1''' an optical device 9 forming a dispersion compensation module (DCM) with an optical compensation fiber 10 generating an additional tilt is present. The optical device 9 is preceded by the filter 7 which is used in this case for correcting the span loss tilt of the fiber 8 and the tilt generated by the compensation fiber 10 at the same time. The filter 7 may also be adapted to compensate for the tilt generated by further optical devices in the amplification unit 1'''.

For a better understanding of the advantageous effects of the use of the amplification units as described in FIG. 1 to FIG. 4, FIG. 7 shows a diagram representing a gain error being defined as a channel power difference when all channels (sixteen channels equally spaced in the C band) are present at the input of an optical transmission line and when only one channel (at a selected wavelength) is present, in dependence of the number of the amplification unit (EDFA) along the fiber line. The gain error is measured for three channels around 1530 nm, 1546 nm and 1561 nm. The situation shown represents the case when there is a total channel power difference of 12 dB and the output power of the optical amplification units is 17 dBm in full load configuration.

Figure 7:
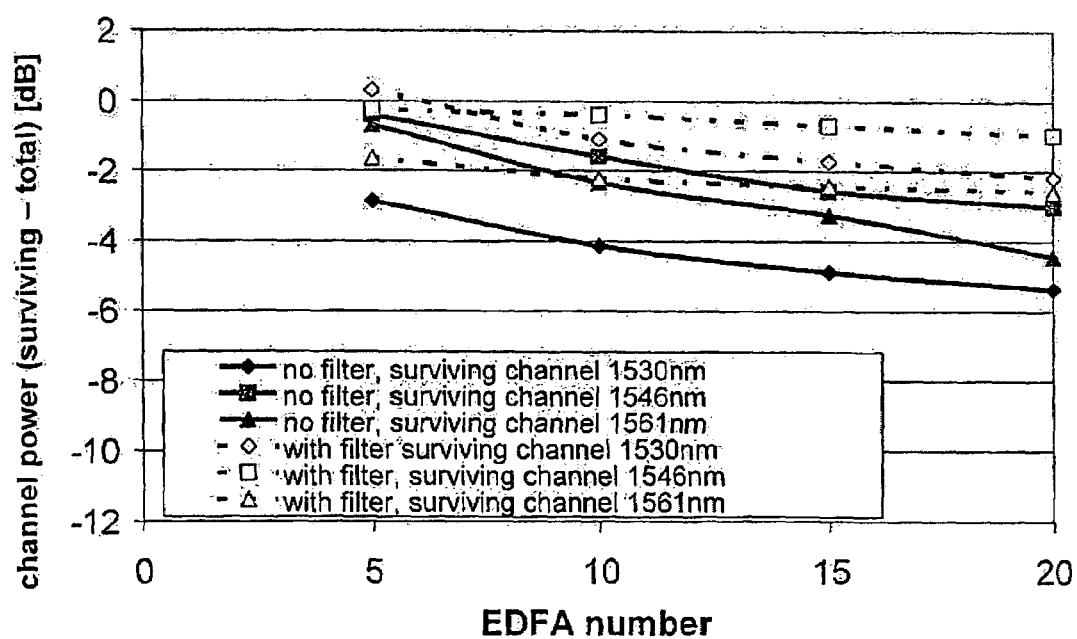
FIG. 7 shows a diagram depicting a difference between channel powers of an optical transmission system in a partial and full load configuration in dependence of the amplifier number of a fiber line.

The solid lines in the diagram of FIG. 7 represent the case when there is no filter present which compensates for the tilt of the span loss of the fiber spans. In the case shown by the solid lines, the gain of the optical amplifiers (EDFAs) is tilted by 2 dB, e. g. by a VOA, to compensate for the span loss tilt of the fiber spans. In this case the gain error is due to the combined effect of: fiber span loss tilt, EDFA gain excursion, ASE (amplified Spontaneous Emission), spectral hole-burning (SHB), and inaccuracy of the EDFAs in constant gain mode.

The dotted lines in the diagram of FIG. 7 represent the case where a filter is used to compensate for the tilt of the span loss of the optical fiber spans and/or DCM tilt loss. In the case depicted by the dotted lines, the gain of the optical amplifiers (EDFAs) is not tilted, so the tilt of the amplifiers is 0.0 dB. In that case the gain error is due to the combined effect of EDFA gain excursion, ASE, SHB and inaccuracy of the EDFAs in constant gain mode.

From FIG. 7 it can be seen that the gain error after twenty optical amplification units is greatly reduced in the 1530 nm wavelength region by the use of at least one optical amplification unit comprising a filter 7 as shown in FIG. 1. In this region the gain error is reduced by ~3 dB from 5 dB to 2 dB. In the 1560 nm wavelength region the gain error is reduced by 2 dB.

If the maximum allocated power fluctuation in the optical transmission system is limited to 3 dB when the loading conditions change, it can be seen from FIG. 7 that the number of optical amplification units comprising EDFAs can be increased from five to twenty, thus allowing transmission over large distances compared to the commonly used transmission systems. Also, the margins allocated for various loading conditions can be reduced and the overall system performance can be improved.

The invention claimed is:

1. An optical amplification unit comprising at least one optical amplifier for amplifying an optical signal, said optical amplifier comprising:
  an amplification stage, wherein said amplification stage comprises a gain flattening filter that compensates for a non-flat gain of the amplification stage;
  a first measuring device for measuring a property of an input signal of said optical amplifier;

a second measuring device for measuring a property of an output signal of said optical amplifier, and a control circuit for controlling a gain characteristic of said optical amplifier in dependence of said input and output signal properties, said optical amplification unit further comprising a filter, wherein said filter precedes or follows said optical amplifier and exhibits a wavelength-dependent attenuation of the optical signal adapted to compensate for a span loss tilt caused by an optical fiber span connectable to the optical amplification unit.

2. The optical amplification unit according to claim 1, wherein said optical amplifier is controlled in constant gain mode.

3. The optical amplification unit according to claim 1, wherein said optical amplifier is an Erbium-doped fiber amplifier.

4. The optical amplification unit according to claim 1, wherein said filter exhibits a fiber Bragg grating.

5. The optical amplification unit according to claim 1, wherein each of said first and second measuring devices comprises a photodiode.

6. The optical amplification unit according to claim 1, wherein said optical amplification unit comprises at least two of said optical amplifiers, and said filter is placed preceding the first of said optical amplifiers or following the last of said optical amplifiers.

7. The optical amplification unit according to claim 1, wherein said optical amplification unit comprises at least two of said optical amplifiers, said filter is placed in between any two of said optical amplifiers, and each of said optical amplifiers is independently controlled, preferably in constant gain mode.

8. The optical amplification unit according to claim 1, wherein said optical amplification unit further comprises an optical device generating an additional tilt and said filter is adapted to compensate for said span loss tilt and said additional tilt.

9. The optical amplification unit according to claim 8, wherein said optical device is a dispersion compensation module.

10. A fiber optical system for transmitting an optical signal, in particular WDM system, comprising an optical fiber line with a plurality of successive optical fiber spans, at least two of which are interconnected by an optical amplification unit according to claim 1.

11. A method fiber transmitting an optical signal through a fiber line of a fiber optical system according to claim 1, whereby the step of: adapting a respective filter of each of said optical amplification units to compensate for an average span loss tilt of said optical fiber spans.

12. A method for amplifying an optical signal in an optical amplification unit comprising at least one optical amplifier for amplifying said optical signal, said optical amplifier comprising:

an amplification stage, wherein said amplification stage comprises a gain flattening filter that compensates for a non-flat gain of the amplification stage;

a first measuring device for measuring a property of an input signal of said optical amplifier;

a second measuring device for measuring a property of an output signal of said optical amplifier, and a control circuit for controlling a gain characteristic of said optical amplifier in dependence of said input and output signal properties, said optical amplification unit further comprising a filter.

wherein said filter precedes or follows said optical amplifier and exhibits a wavelength-dependent attenuation of the optical signal adapted to compensate for a span loss tilt caused by an optical fiber span connectable to the optical amplification unit;

said method for amplifying comprising the steps of:

(a1) measuring a property of an input signal of an optical amplifier, (a2) measuring a property of an output signal of said optical amplifier, (a3) controlling, a gain characteristic of said optical amplifier in dependence of said input and output signal properties, (a4) compensating for a non-flat gain of the amplification stage, (b) filtering said optical signal for compensating for a span loss tilt generating a wavelength-dependent attenuation of said optical signal, wherein steps (a3) and (b) are preformed independently from one another.

* * * * *